United States Patent [19]

Scollard

[11] Patent Number: 4,980,005
[45] Date of Patent: Dec. 25, 1990

[54] METHOD FOR PRODUCING AN AEROSPACE STRUCTURE HAVING A CAST-IN-PLACE NONCOMPRESSIBLE VOID FILLER

[75] Inventor: Cynthia M. Scollard, Kent, Wash.

[73] Assignee: The Boeing Company, Seattle, Wash.

[21] Appl. No.: 336,412

[22] Filed: Apr. 11, 1989

Related U.S. Application Data

[62] Division of Ser. No. 25,403, Mar. 13, 1987, Pat. No. 4,861,643.

[51] Int. Cl.$^5$ .......................... B32B 31/16; B32B 7/08
[52] U.S. Cl. ...................................... 156/92; 156/330; 428/120; 428/328
[58] Field of Search .......................... 156/91, 92, 330; 428/43, 119, 120, 328

[56] References Cited

U.S. PATENT DOCUMENTS

| | | |
|---|---|---|
| 2,140,672 | 12/1938 | Gray et al. . |
| 2,460,181 | 1/1949 | Marshall . |
| 2,999,080 | 9/1961 | Wilcox . |
| 3,021,234 | 2/1962 | Casement et al. . |
| 3,022,870 | 2/1962 | John et al. . |
| 3,142,610 | 7/1964 | Lowe . |
| 3,316,187 | 4/1967 | Grosner et al. . |
| 3,386,223 | 6/1968 | Wegwerth ............................ 52/741 |
| 3,533,985 | 10/1970 | Lantz et al. . |
| 3,670,091 | 6/1972 | Frantz et al. ................... 174/52 PE |
| 3,692,549 | 9/1972 | Martin ................................... 106/33 |
| 3,826,773 | 7/1974 | Cooke, Jr. . |
| 3,832,426 | 8/1974 | Malthouse et al. .................. 264/29 |
| 3,849,187 | 11/1974 | Fetscher et al. . |
| 3,864,426 | 2/1975 | Salensky . |
| 3,917,547 | 11/1075 | Massey ................................ 260/2.5 |
| 3,993,608 | 11/1976 | Wells . |
| 4,013,810 | 3/1977 | Long ................................... 428/308 |
| 4,035,545 | 7/1977 | Ivanov et al. ....................... 428/328 |
| 4,054,714 | 10/1977 | Mastrangelo ....................... 428/328 |
| 4,135,019 | 1/1979 | Kourtides et al. .................. 428/117 |
| 4,242,388 | 12/1980 | Kaufmann ............................. 428/35 |
| 4,273,806 | 6/1981 | Stechler .............................. 427/119 |
| 4,288,337 | 9/1981 | Ota et al. ............................ 252/512 |
| 4,293,519 | 10/1981 | Knappenberger et al. ..... 264/272.13 |
| 4,303,730 | 12/1981 | Torobin .............................. 428/333 |
| 4,316,936 | 2/1982 | Hing ................................... 428/325 |
| 4,496,475 | 1/1985 | Abrams .............................. 252/514 |
| 4,507,011 | 3/1985 | Brown ................................. 403/404 |
| 4,507,359 | 3/1985 | Powers, Jr. ......................... 428/328 |
| 4,556,439 | 12/1985 | Bannink, Jr. .......................... 156/92 |
| 4,556,591 | 12/1985 | Bannink, Jr. .......................... 428/43 |
| 4,556,592 | 12/1985 | Bannink, Jr. .......................... 428/43 |
| 4,566,990 | 1/1986 | Liu et al. ............................ 252/503 |
| 4,716,081 | 12/1987 | Ehrreich ............................. 428/403 |

*Primary Examiner*—Robert A. Dawson
*Attorney, Agent, or Firm*—Christensen, O'Connor, Johnson & Kindness

[57] ABSTRACT

Method for producing an aerospace structure composed of two elements having mutually opposed mating surfaces, at least one of which is irregular. The mating surfaces of the elements are fastened and compressed against a noncompressible cast-in-place void filler having complimentary shape to the two mating surfaces. The void filler is prepared by admixing a polymerizing matrix selected from polyesters, epoxides, polyamides, polyimides, polycarbonates, polyvinyl alcohols and organosilicone polymers and a space filling material selected from phenolic microspheres, carbon microspheres, metal coated microspheres, chopped fiberglass, alumina, fumed silica and mixtures thereof.

7 Claims, 1 Drawing Sheet

METHOD FOR PRODUCING AN AEROSPACE STRUCTURE HAVING A CAST-IN-PLACE NONCOMPRESSIBLE VOID FILLER

This is a divisional of the prior application Ser. No. 07/025,403, filed Mar. 13, 1987 now U.S. Pat. No. 4,861,643, issued Aug. 29, 1989.

This invention relates to aerospace structures and methods of shimming elements of these structures to their proper final contour. Specifically, this invention relates to graphite composite aerospace structures having irregular, mutually opposed internal surfaces separated by a cast-in-place, curable, noncompressible void filler. This invention relates to aerospace structures and methods for aligning and joing the same to form an integrated structure from a plurality of elements. Specifically, this invention relates to joining elements composed of a graphite composite material at a location where the elements are juxtaposed along mutually opposing surfaces. This invention further relates to a method for constructing an aerospace structure by interposing a noncompressible, void filler between opposing composite surface elements.

BACKGROUND OF THE INVENTION

Bonding stiff parallel surface panels to a resin core in order to produce a lightweight yet strong structural sandwich has been known for a long time. Furthermore, curable resins that provide a range of densities and strengths, particularly those resins that provide a high strength-to-weight or stiffness-to-weight ratio, have been used to produce structural sandwiches. Long, U.S. Pat. No. 4,013,810, discloses one such sandwich in which the resin core contains a mixture of resin and hollow glass microspheres. The resins disclosed by Long can be molded into complex shapes suitable for use in aircraft flooring and engine nacelles. The sandwich panels disclosed by Long are composed of a compression molded thermoplastic resin fabricated under conditions of high temperature and pressure and provide some capability for postforming. Structures formed as described by Long are relatively strong and lightweight but have a low compression strength of approximately 1,000 psi.

Lightweight resins such as epoxy or polyester resins having hollow organic or inorganic microspheres incorporated therein have been suggested for use in several structural applications. Massey, U.S. Pat. No. 3,917,547, discloses polyurethane foams that have hollow silica microspheres incorporated in an organic polymeric matrix having improved compression strength. Similarly, both carbon and phenolic microspheres have been incorporated in a variety of resins to produce lightweight materials having good insulation properties. Resins that incorporate metal coated organic and inorganic particles or spheres to enhance electroconductivity or to prevent electromagnetic interference (EMI) and provide radio frequency interference (RFI) shielding are also known. For example, U.S. Pat. No. 4,496,475 describes an electroconductive body suitable for use as termination elements for capacitors fabricated from resins containing at least 10% by weight silver distributed between silver particles and inorganic silver coated spheres. U.S. Pat. No. 4,566,990 discloses conductive thermoplastics in which fibers of glass or graphite are coated with aluminum, copper, silver, nickel, iron or alloys thereof. These metals are present in from 8 to 12% by weight and effectively shield electronic equipment sensitive to EMI/RFI.

Many aerospace structures, such as selected elements of aerodynamic surfaces including wing flaps and ailerons, are now composed of composite structures. Current methods for fabrication of composite structural components require that opposing surfaces of these elements be formed together, normally in an abutting relationship. Because these elements are composed of composites, the tolerances to which these parts can be manufactured are not held to as strict a tolerance as is available for machined metal parts. Furthermore, one or more of the surfaces of composite components are often irregular. As a consequence, when an aerospace structure is assembled from two of these composite structural components with their smooth aerodynamic surfaces facing outward, an irregular gap will exist between the two mated surfaces. This gap in the final aerospace structure is unacceptable because localized overstressing is caused when, for example, the parts are riveted together. Filling the gap between the surfaces has been achieved; however, current methods have several drawbacks. For example, one method involves hand-forming a solid shim from a material such as aluminum. Another method involves removing plys from a shim made of a laminated polymer until the required contour and shape are achieved. Both of these methods require trial fitting, removal, hand-shaping and refitting of the shim until a satisfactory contour is achieved. These methods are labor intensive, time-consuming and produce a nonstandard product that varies in quality with the skill of the mechanic. Often the contour of the gap is complex, that is, it varies in thickness in both directions simultaneously and the gap cannot be adequately filled by either method. Any gap remaining after shimming may result in localized distortion and stressing of the composite structure when the fasteners are installed.

SUMMARY OF THE INVENTION

The foregoing problems can be overcome by producing an aerospace structure in which the two structural elements are fastened and compressed against a noncompressible shim which has been complimentary contoured to conform to the irregularities in the abutting surfaces of the two structural elements. The correctly contoured shim is made of a curable cast-in-place polymer which, in its uncured state, can completely fill the void between the two mating surfaces. The cast-in-place void filler is forced directly into the gap with the shimmed surfaces acting as two side of the mold. The uncured void filler is suitably viscous to be forced into the gap between the irregular shimmed surfaces without draining the gap, thereby producing voids prior to curing. Uncured void filler is injected into the gap from the opening nearest the leading ends of the shimmed surfaces, filling the gap and protruding from the trailing ends of the shimmed surfaces. The opening nearest the leading ends is then dammed with putty, which acts as a temporary mold surfaces until the void filler cures. Upon curing, the two surface elements of the aerodynamic structure are fastened together, compressing the irregular surfaces against the cured void filler. Since the resulting shim conforms exactly to the irregularities in the shimmed surfaces, thereby uniformly distributing the stresses across the aerodynamic structure, excess cured void filler protruding from the trailing edge of the aerodynamic structure is then shaped to meet the desired final contour.

Void fillers suitable for use in the present invention are preferably heat stable, relatively noncompressible when cured, and have high strength-to-weight ratio. Compression strength must range from about 2,000 to 30,000 psi and preferably in a range of from 5,000 to 25,000 psi. Furthermore, void filler must retain their noncompressibility at temperatures ranging from −30 to 200° F. To achieve high strength-to-weight ratios, the void filler contains a heat stable polymerizing matrix. Polymerizing matrices most suitable for use in the present invention are epoxies, polycarbonates, polyvinyl, alcohols, polyesters, polyamides, polyimides and organosilicon polymers, and, most preferably, epoxides. These polymerizing matrices are present in the void filler in a range of from 60 to 100% and preferably in a range of from 80 to 90%. The balance of the resin is composed of space filling material necessary to achieve lightweight, electro-chemical neutrality, or electrical conductivity. Suitable electrochemically neutral space filling material may be selected from phenolic resins, carbon microsphers, chopped fiberglass, alumina, fumed silica and mixtures thereof. When the aerodynamic elements of the aerospace structure are composed of graphite composite, it is preferred that the electrochemically neutral spacing filling material be hollow or solid carbon microspheres. When it is desired that the space filling material be electrically conducting, the carbon particles introduced into the resin are coated with metal. It is preferred that the metal coating be either nickel, iron, copper, silver, silicon or mixtures thereof. To be suitably electrically conducting, the percent by weight of electrically conducting metal in the void filler should be at least 1% and, most preferably, from 1 to 1.5%.

DESCRIPTION OF THE PREFERRED EMBODIMENT

Figure 1:
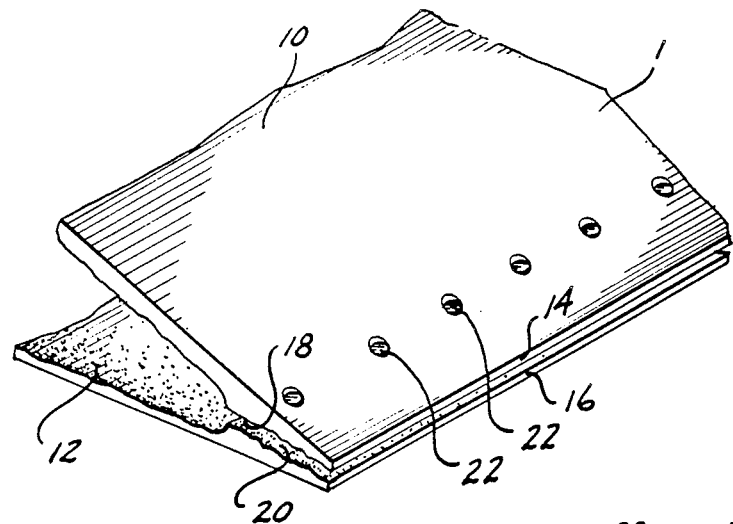
FIG. 1 is an isometric view of the two elements of an aerodynamic control surface structure, showing a gap between the two irregular surfaces along which the elements will be joined.

The present invention provides a structure and method for joining mutually opposing surfaces of aerospace structures. Examples of aerospace structures that can be constructed in accordance with the present invention include structural control elements such as elevators, ailerons, rudders, and similar control surfaces. Normally, these control surfaces comprise a pair of surface skins that are separated and reinforced by internal structural elements. The upper and lower skins must then be joined at the leading ends and at the trailing ends. The term leading end, as used herein, describes that end of the structure nearest the leading edge of the control surface, and conversely, the term trailing end describes that end nearest the trailing edge of the control surface. The present invention is particularly adaptable for joining trailing ends of control surfaces. For example, referring to FIG. 1, a partial view of the trailing end of a control surface includes upper skin element 10 and lower skin element 12. The upper surface of supper skin element 10 forms an upper aerodynamic surface while the lower surface of lower skin element 12 forms a lower aerodynamic surface. The skins terminate at parallel trailing ends 14 and 16, respectively. Internally and forward of the trailing ends are mutually opposing substantially parallel, spaced abutment surfaces 18 and 20. The abutment surfaces are irregular and will not fully contact each other when drawn together by fasteners such as rivets. Therefore, in accordance with the present invention, a viscous curable void filler is injected into the space between these two abutment surfaces, therein conforming to the irregularities of the mutually opposed abutting surfaces. The curable void filler is then cured and fasteners such as rivets 22 are applied to draw the trailing end regions of the skin elements tightly together to form an integral trailing edge.

Composite surface elements suitable for use in the present invention include metals such as titanium and aluminum, as well as numerous alloys of those materials, and nonmetals such as fiberglass and epoxy graphite composites. The present invention is most suitable for use in connection with composite components.

Figure 2:
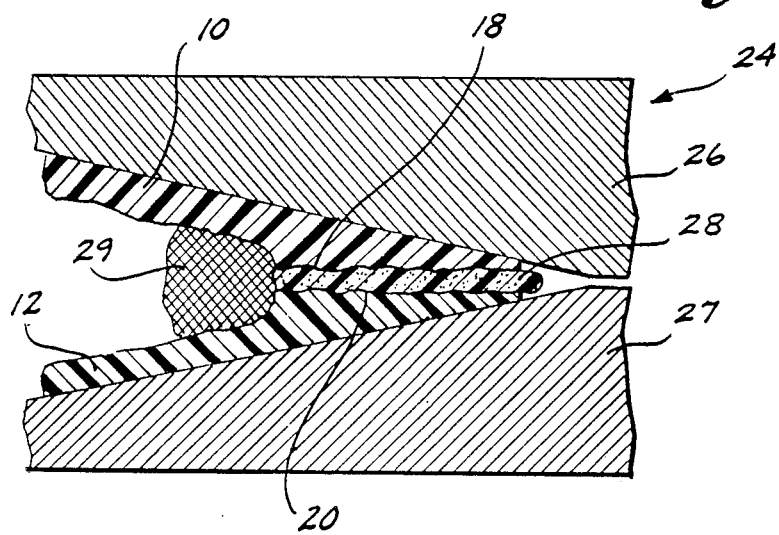
FIG. 2 shows a side section of a tool and an aerospace structure being joined in accordance with the present invention with a noncompressible, curable void filler functioning as a shim customized precisely for the irregular surfaces; and, FIG. 3 is a cross section of the aerospace structure with the two surface elements fastened by a rivet to sandwich and compress the elements against the noncompressible void filler.

Referring now to FIG. 2, an aerospace structure is constructed in accordance with the present invention by placing the upper and lower skin elements 10 and 12 between an appropriate tool 24 having upper and lower halves 26 and 27. The upper and lower skins are positioned in the tool 24 so that the upper and lower aerodynamic surfaces are held in a desired orientation, for example, in a converging relationship toward the trailing end. The tool is designed so that the mutual abutment surfaces 18 and 20 adjacent to the trailing end of the structure are juxtaposed in a spaced relationship. In accordance with the present invention, a viscous curable void filler 28 is then injected between the opposing interior surfaces so as to completely fill the space between those surfaces. The void is injected in a rearward direction from the forward end of the opposing surfaces interior of the structural elements rearwardly toward the trailing end. A sufficient amount is injected so that the void filler extrudes beyond the trailing end of the structure. A damming material 29, such as putty or clay, is then positioned in front of the forward portion of the mutually opposed abutment surfaces to prevent the viscous void filler from escaping in a forward direction from the space between the opposing surfaces. The void filler is then allowed to cure. Once cured, the damming material can be removed. Once the voide filler is cured, the entire region or gap between the two irregular, mutually opposed abutment surfaces will be in contact with the surface of the cured void filler so that no gaps or voids exist. Once the void filler is cured, the aerospace structure can also be withdrawn from the tool 24.

Figure 3:
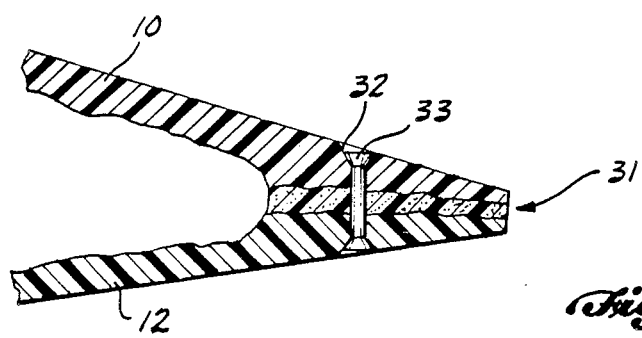

Referring now to FIG. 3, once the structure is removed from the tool 24, excess cured void filler extending beyond the trailing end can be shaped with appropriate milling tools and the final contour of the trailing end 31 is thereby produced. Thereafter, rivet holes can be drilled or otherwise formed adjacent the trailing end of the structure. The rivet holes are generally oriented transversely to the surfaces of the structural elements. Portions of the rivet holes 32 adjacent the surfaces are usually beveled so that an appropriate mating rivet head 33 can mate with beveled portions of the holes to draw and compress the opposing elements to each other. Alternatively, opposing elements may be fastened together against the noncompressible void filler with hard-fasteners, such as threaded or collared bolts. Preferably, the void filler is noncompressible so that no movement of the trailing edge portions of the elements occurs when the rivets are inserted. Thus, since the void filler fills the entire space between the mutually opposing interior surfaces and since no movement of the elements takes place upon insertion of the rivets, the stresses are evenly distributed across the entire trailing end portion of the structure, eliminating the problems associated with prior art.

The noncompressible, curable void filler suitable for use in accordance with the present invention may be composed of a variety of polymerizing and space filling materials. The polymerizing materials are selected from among those that are strong yet lightweight, and include polyesters, epoxides, polyamides, polycarbonates, polyimides, polyetherimides, polyvinyl alcohol and organosilicone polymers. Formulations of these resins, together with their hardeners and space filling materials, are selected so that the proper viscosity and curing times are achieved. It is preferred that the curing time for the viscous void filler ranges from about 2 to about 8 hours, but it is most preferred that the curing time for the void filler ranges from about 3 to about 5 hours. It is also most preferred that the polymerizing matrix be a graphite epoxide. The viscosity of the noncompressible, curable void filler suitable for use in the present invention is that a putty or dough so that it can be easily worked into the space between the opposed abutment surfaces without rapidly draining therefrom.

The range of organic polymeric matrix in the curable, noncompressible void filler suitable for use in accordance with the present invention ranges from 40% by weight up to 100% by weight. It is preferred, however, that the percent polymetric matrix in the curable, noncompressible void filler ranges from about 80 to 90%, with the balance made up of a space filling material. Space filling materials suitable for use in accordance with the present invention include phenolic microspheres, carbon microspheres, chopped fiberglass, alumina, fumed silica, metal coated carbon particles, and mixtures thereof. The choice of type and quantity of space filling material selected depends on the density required, adhesive and thermal properties desired, compressibility strength requirements and electrochemical neutrality or electroconducting property desired. For example, density is decreased by using increasing percentages by weight of hollow microspheres. Increased densities are achieved by using higher polymeric matrix percentages and smaller percentages of hollow microspheres or increased percentages of solid microspheres, especially alumina, silica or metal coated solid microspheres. Densities suitable for use in accordance with the present invention range from about 40 to about 100lb/ft$^3$, with the preferred range in densities being from 50 to 70lb/ft$^3$. Densities may also be increased by mixing and curing the polymeric matrix resins under reduced atmospheric pressure. Conversely, densities are decreased by whipping air into the unpolymerized polymeric matrix.

It is essential that the void filler, when cured, be noncompressible. If the compressibility strength of the void filler is below 2,000 psi, the aerospace structure will become too flexible and unsuitable for use as a control surface. Conversely, if the compressive strength is greater than 30,000 psi, the void filler becomes too brittle and is predisposed to cracking and crumbling, again making the structure unsuitable for use as a control surface. Therefore, the range of compressive strengths suitable for use in accordance with the present invention is from about 2,000-30,000 psi. Suitable compressive strengths may be achieved by using pure polymerizing matrix, for example, pure cured epoxide or polyester. The density of these polymerizing matrices, however, is fairly high, adding substantial weight to the aerospace structure. It is, therefore, preferred that a space filling material of the type previously described be added to the polymerizing matrix to achieve the targeted density and compression strength.

For secondary structural components such as horizontal and vertical stabilizers and spoilers, high resistance to compressibility and lateral sheer is desirable to achieve the proper strength and flight characteristics. The preferred compression strengths for these structures range from 15,000 to 25,000 psi. Since solid carbon and solid aluminum microspheres yield the highest compression strengths when added as space filling material to void fillers, these particles are preferred for this application. For example, a mixture of polymeric matrix and space filling material preferred for use in accordance with the present invention would be a void filler composed of from 80 to 90% epoxide and 10 to 20% solid carbon microspheres. Similarly, a preferred composition for the noncompressible, curable void filler containing solid aluminum microspheres would contain from 85 to 90% epoxide and from 10 to 15% solid aluminum microspheres. Compression strengths for the epoxy polymeric matrix containing solid carbon microspheres would range from 10,000 to 15,000 psi, and, in the case of solid aluminum microspheres, from 12,000 to 13,000 psi. On other areas of the aircraft, where compressibility and lateral sheer strength are not as important as lightweight, preferred space filling material would be selected from phenolic fumed silica and hollow aluminum microspheres. Examples of such aerospace structures would be landing gear doors where a preferred noncompressible, curable void filler formulation would be epoxide containing from 13 to 18% phenolic microspheres. This would produce a structure having a compression strength of from 5,000 to 16,000 psi with a density of approximately 50lbs/ft$^3$. Similarly, examples of preferred compositions of epoxy resin with fumed silica or hollow alumina would be 5 to 8 percent fumed silica and 12 to 15 percent hollow alumina microspheres. These formulations would give compression strengths of from 4,000 to 6,000 and from 5,000 to 6,000 for fumed silica and hollow aluminum microspheres, respectively.

Weight is also an important consideration in aerospace structures. Once the necessary compressibility strengths and lateral sheer strengths have been achieved, it is important to provide a lightweight void filler. Void filler densities suitable for use in accordance with the present invention range from about 40 to about 100 pounds per cubic foot. For secondary structural components, densities suitable for use in accordance with this invention range from 45 to 100 pounds per cubic foot, and it is preferred that densities range from 45 to 75 pounds per cubic foot. In other areas of the aircraft requiring lower compressibility and lateral sheer strengths, weight is more important consideration, and densities of up to 60 pounds per cubic foot are suitable for use in the present invention.

Electrochemical neutrality of the noncompressible void filler with the mated surfaces and fasteners is often necessary to prevent corrosion and loss of structural integrity. Both the polymeric matrix and the space filling material must be electrochemically neutral with respect to a given pair of surface elements and fasteners of the aerospace structure. For example, surface elements composed of graphite epoxy composite may have as their void-filling polymeric matrixe either polyesters, epoxides, polyamides, polycarbonates, polyimides, polyetherimides, polyvinyl alcohol or organsosilcon polymers. Preferred material suitable for use in noncompressible, curable void fillers and which provide the necessary electrochemical neutrality include phenolic carbon and silica microspheres, chopped fiberglass alumina and mixtures thereof.

Preferred space filling materials suitable for use with graphite composite surface elements and epoxide or polyester polymeric matrices include phenolic, carbon and aluminum microspheres. Preferred noncompressible void fillers which provide electrochemical neutrality for aerospace structures having fiberglass and polyaromatic amide surface elements, are composed of epoxide and polyester polymeric matrices and phenolic or carbon microspheres, chopped fiberglass or fumed silica. It is most preferred that noncompressible void fillers having fiberglass surface elements contain epoxide polymeric matrix mixed with chopped fiberglass or fumed silica space filler. For aerospace structures having polyaromatic amide surface elements, the preferred composition of the noncompressible void filler is epoxide mixed with phenolic, chopped fiberglass or fumed silica space filling material. Examples of void filler compositions suitable for use in accordance with the present invention when surface elements are composed of metal, include polyester, epoxide, polyamide, polycarbonate, polyimide, polyetherimide, polyvinyl alcohol and organo silicone polymeric resins with or without space filling materials such as phenolic, carbon or fumed silica microspheres and chopped fiberglass or alumina. It is preferred that for metal surface elements, the aerospace structure have a noncompressible, curable void filler composed of epoxide or polyester polymeric matrix containing phenolic carbon or silica microspheres as a space filling material.

In some instances it is important that the noncompressible, curable void filler adhere to the mutually opposed mated surfaces of the two surface elements. Suitable adhering polymeric matrixes suitable for use in accordance with the present invention include polyesters, epoxides, polyamides, polycarbonates, polyimides, polyetherimides, polyvinyl alcohols and organosilicon polymers. The preferred adhering polymeric matrixes include polyesters and epoxides. In some instances, it may also be desirable that the noncompressible, curable void filler be electrically conducting. In these cases, the space filling material is composed of metal particles, metal-coated organic or inorganic particles, and mixtures thereof. For example, in the case of graphite composite surface elements, it is preferred that the noncompressible void filler be composed of graphite epoxy of from 8 to 20% by weight iron, copper, silver, silicon or nickel-coated carbon microspheres. It is most preferred that secondary structural components having epoxy composite surface elements have a noncompressible, curable void filler composed of epoxide resin and from 9 to 18% iron or nickel-coated carbon microspheres.

EXAMPLES

The following examples are included to assist one of ordinary skill in making and using the invention. They are intended as representative examples of the present invention and are not intended in any way to limit the scope of this disclosure or the scope of protection granted by Letters Patent hereon. All parts and percentages referred to in the following examples are by weight, unless otherwise indicated. Individual formulations may be varied to affect and alter the desired properties and characteristics.

Example 1

Rectangular graphite epoxy surface panels were selected for shimming with a curable void filler and subjected to compression testing. Each composite surface panel had surface dimensions of approximately 2 in. by 6 in. and a thickness of approximately ⅛th in. and had at least one irregular surface. A curable void filler was prepared by adding 11 parts of epoxy hardener to 73 parts of an epoxy resin. These components were then thoroughly mixed and 16 parts of hollow carbon microspheres was added to the mixture. These components were again thoroughly mixed and the resulting viscous mixture was deposited on the irregular surface of one graphite epoxy panel. The irregular surface of a second composite panel was then pressed against the viscous void filler creating a sandwich structure in which both internal surfaces were in contact over their entire surface with the void filler. The thickness of the viscous void filler in the sandwich structure was approximately ¾ in. This structure was then allowed to cure at ambient temperature for 4 hours. The graphite epoxy surface panels in the resulting structure strongly adhered to the void filler. The cured void filler had a density of 50.3 pounds per cubic foot and a compressive strength of 5,200 psi.

Example 2

An aerospace structure having a high density and high compressive strength void filler suitable for use as a secondary structural element was made by the procedure described in Example 1. The void filler was composed of 35.5 parts epoxy resin and 5.2 parts epoxy hardener. To this was added 61.3 parts solid alumina silica microspheres. Upon curing, this noncompressible void filler had a density of 101 pounds per cubic foot and a compressive strength of 16,200 psi.

Example 3

An aerospace structure having a noncompressible, curable void filler suitable for use on landing doors was prepared as described in Example 1 by combining 71.0 parts epoxy resin with 10.7 parts epoxy hardener. To this was added 18.2 parts phenolic microspheres and the resulting mixture was vigorously mixed to entrap air. Upon curing, the density of the cured void filler was found to be 41.3 pounds per cubic foot with a compressive strength of 4,800 psi.

Example 4

An aerospace structure having a noncompressible, curable void filler was prepared according to the procedures described in Example 1 by admixing 74 parts of epoxy resin, 11 parts epoxy hardener, and 15 parts phenolic microspheres. The resulting mixture was deposited between epoxy graphite surface panels as described in Example 1 and allowed to cure under a reduced pressure of 28 torr. Upon curing, the noncompressible void filler was found to have a density of 54 pounds per cubic foot with an average compressive strength of 16,000 psi.

Conclusion

In summary, aerospace structures suitable for use in accordance with the present invention are easily fabricated and produce a standardized product with excellent compression and lateral strength properties. A variety of void fillers may be formulated to provide other desirable properties such as low weight, electrical conductivity, electrochemical neutrality, and adhesion to the surface elements.

Although the primary use of the present invention is currently producing aerospace control surface structures, the invention can also be employed to produce other aerospace and nonaerospace structures having irregular, mutually opposed surfaces requiring good compressibility and lateral sheer strengths. For example, landing gear doors and engine nacelles may be fabricated using the present invention. In these cases greater quantities of hollow microspheres may be incorporated with void filler formulations to produce lightweight structures of suitable strength.

The present invention has been described in relation to a preferred embodiment thereof and several alternatives thereto. One of ordinary skill, after reading the foregoing specification, will be able to effect various changes, substitutions of equivalents, and other alterations without departing from the broad concepts disclosed herein. It is therefore intended that the scope of Letters Patent granted hereon be limited only by the definition contained in the appended claims and equivalents thereof.

The embodiments of the invention in which an exclusive property or privilege is claimed are defined as follows:

1. A method of manufacturing an aerospace structure, said aerospace structure having two elements, each of said elements having a surface, at least one of said surfaces being irregular, said surfaces having a leading end and a trailing end, comprising the steps:
   (a) placing said elements of said aerospace structure in a tool constructed to hold said elements in a desired relative position;
   (b) aligning said elements so that each of said surfaces is oriented in a mutually opposed spaced relationship, and so that the leading end and the trailing end of each element is oriented in a mutually opposed spaced relationship;
   (c) inserting a noncompressible curable void filler into the space between said surfaces; and,
   (d) mechanically fastening said elements to each other.

2. A method of manufacturing an aerospace structure, said aerospace structure having two structural elements, each of said structural elements have an aerodynamic surface and an abutting surface, at least one of said abutting surfaces being irregular, said abutting surfaces having a leading end and a trailing end, comprising the steps:
   (a) placing said structural elements of said aerospace structure in a tool constructed to hold the aerodynamic surfaces of said structural elements in a desired relative position;
   (b) aligning said structural elements so that each of said abutting surfaces is oriented in a mutually opposed spaced relationship, and so that the leading end and the trailing end of each element is oriented in a mutually opposed spaced relationship;
   (c) inserting a noncompressible curable void filler into the space between said surfaces; and,
   (d) mechanically fastening said elements to each other.

3. The method of claim 1, further comprising the step of, prior to mechanically fastening said elements, curing said noncompressible curable void filler.

4. The method of claim 1, wherein said elements are mechanically fastened by riveting said elements so that the irregular surface of said element is held and compressed against said noncompressible cured void filler.

5. The method of claim 1, wherein said elements are mechanically fastened with hard-fasteners so that the irregular surface of said element is held and compressed against said noncompressible cured void filler.

6. A method of manufacturing an aerospace structure, said aerospace structure having two structural elements, each of said structural elements have an aerodynamic surface and an abutting surface, at least one of said abutting surfaces being irregular, said abutting surfaces having a leading end and a trailing end, the method comprising the steps of:
   (a) placing said structural elements of said aerospace structure in a tool constructed to hold the aerodynamic surfaces of said structural elements in a desired relative position;
   (b) aligning said structural elements so that each of said abutting surfaces is oriented in a mutually opposed spaced relationship, and so that the leading end and the trailing end of each element is oriented in a mutually opposed spaced relationship;
   (c) injecting a noncompressible curable void filler into the space between the mutually opposed leading ends of said elements so that the space between said mutually opposed abutting surfaces is filled with void filler, and so that excess void filler protrudes beyond said mutually opposed trailing ends of said elements;
   (d) damming the mutually opposed spaced leading ends with damming material, said damming material being pliant and releasable, thereby providing a barrier so that said void filling material does not drain from said space prior to curling; and,
   (e) mechanically fastening said elements to each other.

7. A method of manufacturing an aerospace structure, said aerospace structure having two structural elements, each of said structural elements having an aerodynamic surface and an abutting surface, at least one of said abutting surfaces being irregular, said abutting surfaces having a leading end and a trailing end, the method comprising the steps of:
   (a) placing said structural elements of said aerospace structure in a tool constructued to hold the aerodynamic surfaces of said structural elements in a desired relative position;
   (b) aligning said structural elements so that each of said abutting surfaces is oriented in a mutually opposed spaced relationship, and so that the leading end and the trailing end of each element is oriented in a mutually opposed spaced relationship;

(c) inserting a compressible, curable void filler into the space between the mutually opposed leading ends of said elements so that the space between said mutually opposed surfaces is filled with void filler, and so that excess void filler protrudes beyond said mutually opposed trailing ends of said elements;

(d) curing said noncompressible curable void filler;
(e) shaping the void filler protruding from the trailing end of said aerospace structure to its proper final contour; and
(f) mechanically fastening said elements to each other.

* * * * *

UNITED STATES PATENT AND TRADEMARK OFFICE
CERTIFICATE OF CORRECTION

PATENT NO. : 4,980,005
DATED : December 25, 1990
INVENTOR(S) : Cynthia M. Scollard It is certified that error appears in the above-identified patent and that said Letters Patent is hereby corrected as shown below:

| Column | Line | Error |
|---|---|---|
| 1 | 16 | "joing" should be --joining-- |
| 2 | 52 | "side" should be --sides-- |
| 3 | 23 | "microsphers" should be --microspheres-- |
| 4 | 6 | "supper" should be --upper-- |
| 4 | 54 | "voide" should be --void-- |
| 5 | 33 | after "that" insert --of-- (first occurrence) |
| 5 | 60 | "100lb/ft$^3$" should be --100 lb/ft$^3$-- |
| 5 | 61 | "70lb/ft$^3$" should be --70 lb/ft$^3$-- |
| 6 | 48 | "50lbs/ft$^3$" should be --50 lbs/ft$^3$-- |
| 7 | 11 | "matrixe" should be --matrix-- |
| 7 | 13 | "organsosilcon" should be --organosilicon-- |
| 7 | 14 | after "Preferred" insert --polymeric matrixes include epoxide and polyesters. Space filling-- |
| 10 (Claim 7, Line 9) | 61 | "constructued" should be --constructed-- |

Signed and Sealed this

Seventh Day of January, 1992

*Attest:*

HARRY F. MANBECK, JR.

*Attesting Officer*     *Commissioner of Patents and Trademarks*